Jan. 15, 1963  R. P. PIFFATH ET AL  3,073,643
CARGO RELEASE HOOK
Filed Jan. 29, 1960  3 Sheets-Sheet 1
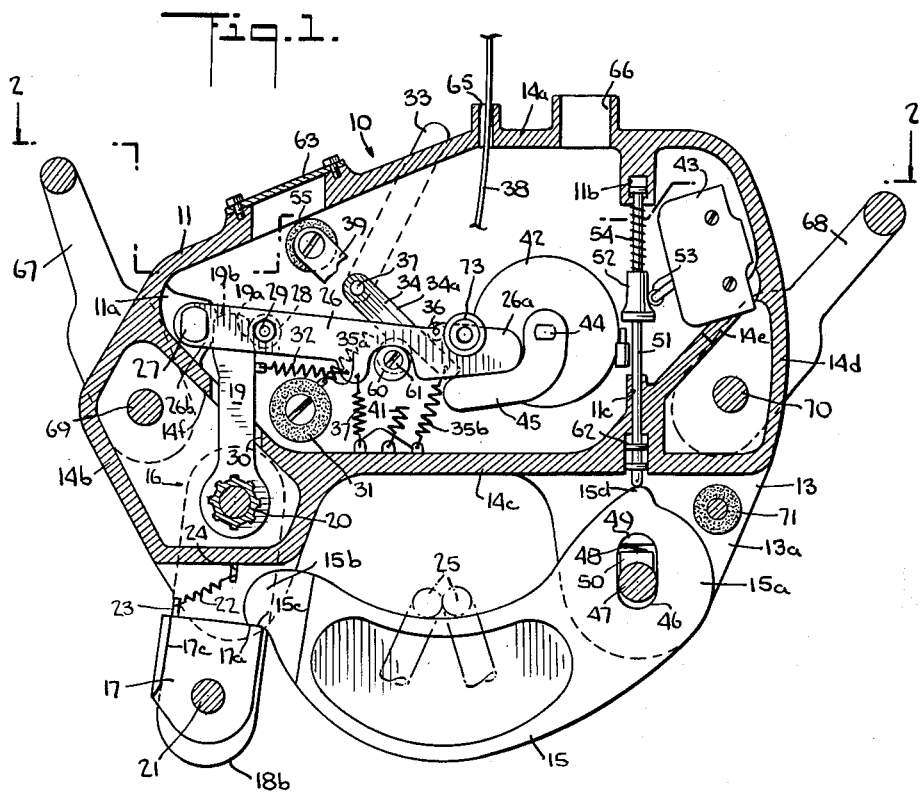
INVENTORS
RALPH P. PIFFATH
JAMES J. SHAW
BY
Kenyon & Kenyon
ATTORNEYS

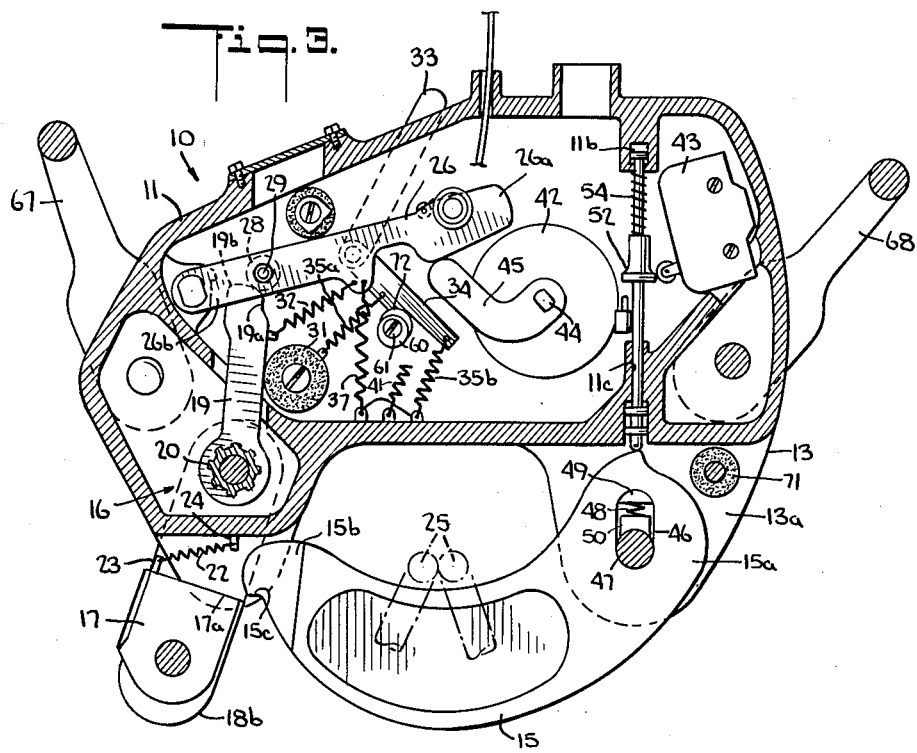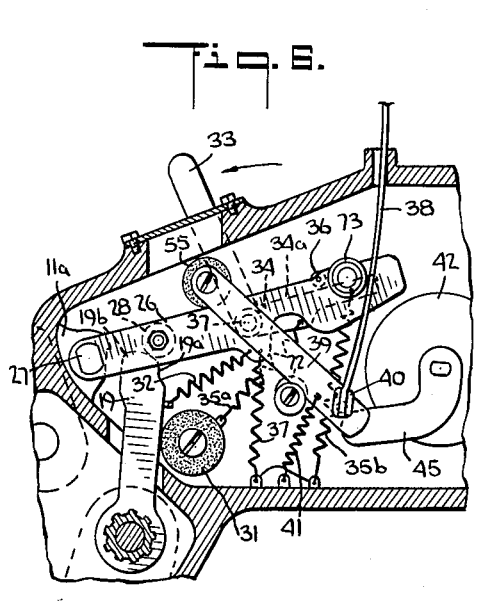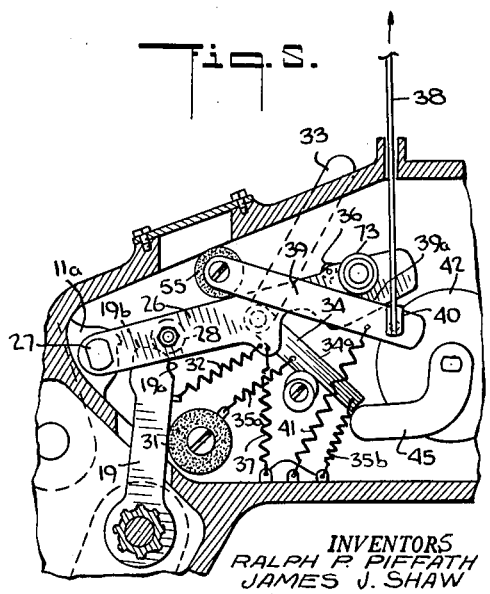

Jan. 15, 1963    R. P. PIFFATH ET AL    3,073,643
CARGO RELEASE HOOK
Filed Jan. 29, 1960    3 Sheets-Sheet 3
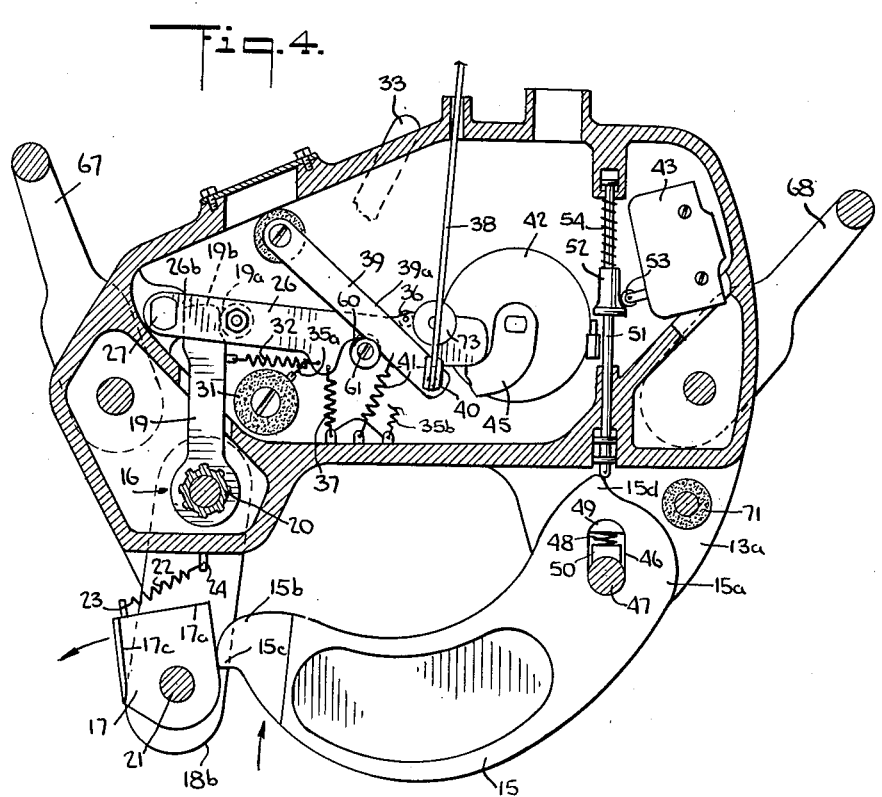
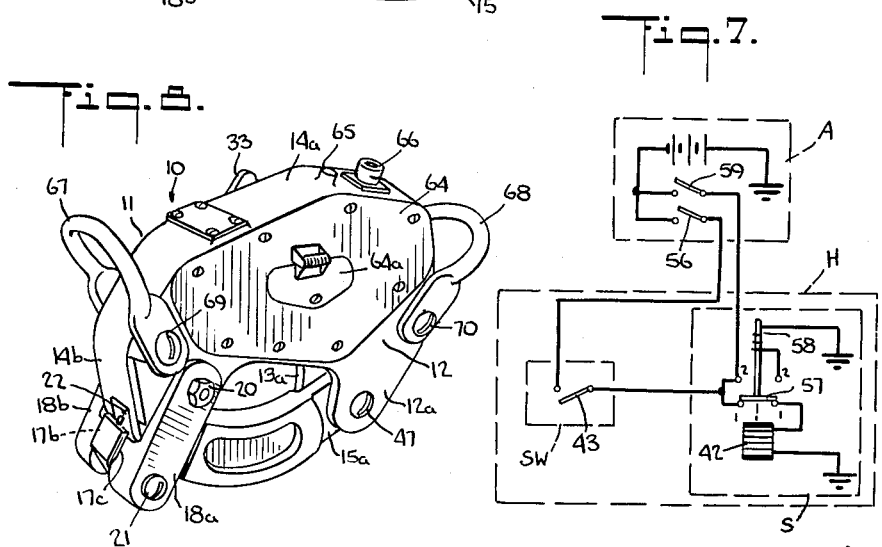
INVENTORS
RALPH P. PIFFATH
JAMES J. SHAW
BY
Kenyon & Kenyon
ATTORNEYS

United States Patent Office 3,073,643
Patented Jan. 15, 1963

3,073,643
CARGO RELEASE HOOK
Ralph P. Piffath, East Norwich, and James J. Shaw, Levittown, N.Y., assignors to Superior Magneto Corp., Long Island City, N.Y., a corporation of New York
Filed Jan. 29, 1960, Ser. No. 5,437
5 Claims. (Cl. 294—83)

This invention relates to cargo suspension and release means whereby a suspended cargo load may be automatically released upon lowering the same into contact with the ground or other support on which it is intended that the cargo come to rest. More particularly, the invention relates to a load-carrying cargo release hook particularly suitable for use in suspending and lowering cargo loads from airplanes, helicopters, and the like, and by parachute drop. Of course, the invention is useful in other applications such as for suspending and lowering loads from overhead cranes, and by block and tackle and similar apparatus, so that it is not intended to limit the application of the inventoin to use with aircraft. For simplicity in the description thereof, however, the invention will be described in connection with such aircraft use.

In use, the cargo hook itself will be suspended from the aircraft by cable or other common means, and the cargo load, in turn, will be similarly suspended from the hook. The cargo may be manually released from the hook either in mid-air or upon having been desposited on the ground, the manual release means being operable either at the hook or remotely therefrom. The invention also includes electrical means whereby the load may be released at any time. A principal feature of the present cargo hook, however, is its ability to automatically release the load upon touch-down, or, in other words, upon all, or the major portion of the load (in amount as may be predetermined) having come to rest on the ground.

In the past, cargo release hooks which function in similar manner have been known. However, most do not include means which provide cargo release by all of the stated alternative modes of operation. Where they do include such means, the previous apparatus has been found complicated by inclusion of a relatively large number of moving parts, or unreliable in operation. Their construction is initially relatively expensive, and further involves maintenance expense greatly disproportionate to the unobtrusive nature of the apparatus.

Accordingly, it is a principal object of the invention to provide a cargo release hook incorporating all of the release features found in previous cargo hooks, yet which will have extremely simple construction and reliability of operation. It is intended that relatively few movable parts be included in the construction, these being rugged and dependable in operation, whereby initial cost and maintenance expense will be reduced.

Because such cargo hooks are normally intended for out-of-doors operation, it is advisable that the apparatus be water-proofed and dust-proofed. Previously known cargo hooks have not been waterproof or dust-proof due to difficulties inherent from the construction and arrangement of their parts. It is therefore an object of the present invention to provide a cargo hook having all of the referred to features which is waterproof and dust-proof with resulting increased dependability of operation under rugged operating conditions.

It is another object of the invention to provide an extremely rugged cargo release hook, incorporating all of the above described features of operation, which is capable of supporting comparatively greater operational and static loads than have been attainable heretofore. For example, the cargo hook to be described weighs only about 14 lbs., yet will support operational loads up to 15,000 lbs., and static loads up to 50,000 lbs. Furthermore, it is intended that the internal release mechanism of the cargo hook be either manually or automatically operable upon application of very small forces to it, despite these relatively heavy loads being suspended from the hook. This feature imparts advantages over previous cargo hooks in that, for example, the present cargo hook is extremely sensitive and instantaneously responsive to actuation of the release mechanism by any of the several means of actuation which are provided.

As a further object, it is intended to provide a cargo hook wherein several safety features are inherent from the construction, causing its operation to be foolproof. By novel arrangement of the parts, safety in operation actually becomes greater as the cargo hook is called upon to support greater loads. In addition, the internal release mechanism of the cargo hook, which is intended to return immediately to its normal, hook-locking position after the hook has been released, is arranged and constructed to operate in a manner whereby its failure to return to its locking position, or jamming of it, is impossible.

It is still another object of the invention to provide a cargo hook wherein, after the hook member has been released, that member may be returned to its locked closed position without causing any actuation or movement whatsoever of the internal release mechanism of the cargo hook, thereby reducing likelihood of malfunction of the release mechanism.

It is yet another object of the invention to provide a cargo hook in which all of the moving parts thereof are conveniently accessible for inspection and maintenance purposes.

Generally describing the invention, the present cargo hook has a tongue, or hook member from which the cargo is suspended by cable or other usual means. The tongue is pivotally connected at one of its ends to the main body, or housing of the cargo release hook apparatus, and swings between its open and closed positions with respect to the housing. The opposite end of the hook, referred to hereafter as the free end, when in its closed position rests on a latch piece reposing between a pair of outer links which are pivotally connected to the housing. The latch piece and outer links form part of a latch assembly which also includes a splined shaft which connects the outer links through the housing at their pivot ends and which is pivotable therewith, and a release arm also attached to the splined shaft which extends into the housing on the side opposite the links. Thus, the latch assembly pivots as a unit with respect to the housing when the tongue is to be released or, in other words, permitted to move to its open position. When the tongue is moved to its closed position, the latch assembly as a whole does not pivot with respect to the housing, but only the latch piece will pivot momentarily with respect to the outer links, upon contact of the free end of the tongue, to permit the tongue to pass to its closed position. Momentary pivoting of the latch piece is achieved by spring bias means as will be more fully explained. As will become apparent, the novel arrangement and construction of the latch assembly is a feature of the invention which assists the attainment of waterproofing and dustproofing features of the apparatus in simple and economical manner.

Locking and unlocking of the latch assembly is effected by movement of a latch release link, or yoke which is pivotally mounted at one of its ends within the housing. The arrangement of the yoke with respect to the release arm of the latch assembly is such that normally the release arm is restrained from pivotal movement by the yoke, the release arm engaging the yoke by contact with roller means of the yoke located a distance inwardly of the yoke pivot end. The other end of the yoke is a free end, but which is engaged by an arm which extends radially from the shaft of a rotary type, electrically operated solenoid, or motorized actuator. The free end of the yoke also is engaged by an aircraft-manual release link and cable, the latter extending upwardly out of the housing into the airplane, and by a ground-manual release link which connects to a handle or lever outside of the housing. Thus, unlocking movement of the latch release yoke may be initiated either by rotary movement of the solenoid or by movement of either of the manual release means, any of which will cause the yoke to swing upwardly to permit release of the latch assembly. The arrangement further permits the force which is exerted on the yoke by the latch assembly to be absorbed in direction along the length of the yoke and, ultimately, by its pivot pin, the direction and location of maximum strength.

The rotary solenoid may be actuated by closing a switch located in the cockpit of the airplane, or by a switch within the hook housing which closes in response to reduction of the cargo load on the tongue, which reduction will occur, for example, upon the load coming to rest on the ground. Switch response to reduction of tongue load is accomplished by means provided at the pivot end of the tongue which cause movement of a switch plunger within the housing. The plunger, in turn, causes closing of the switch. By a slot and spring arrangement at the pivot end of the tongue, as will be more fully described, the tongue is normally biased upwardly toward the housing when no cargo is being carried. The weight of a cargo load applied to the tongue causes limited downward movement of the tongue at its pivot end in direction against its upward bias, and consequent similar movement of the switch plunger to deactivate the solenoid switch. Upon touching the ground, a major portion of the weight of the load will be supported by the ground, rather than by the tongue of the hook, and this permits limited upward movement of the tongue at its pivot end which is sufficient to cause similar movement of the switch plunger to actuate the swtich. Actuation of the switch causes limited rotative movement of the shaft of the solenoid which, in turn, by its associated radially extending arm, moves the latch release yoke to permit the latch assembly to pivot, thereby releasing the free end of the tongue to release the cargo. It will be observed that the parts are arranged so that the weight of the cargo load acts upon the latch assembly in a manner tending to release the tongue. However, it is also true that this same directional tendency promotes more positive locking of the release mechanism when in its locked position.

Adjustment means are provided to alter the response of the release mechanism with respect to the amount of load reduction desired to cause opening of the tongue. Thus, the apparatus can be set to respond to any predetermined amount of load reduction in simple, yet effective manner.

These and other objects and features of the invention will become more fully apparent from the following detailed description thereof, when taken with reference to the accompanying drawings in which:

FIGURE 1 is a partially sectionalized side view of a cargo hook built in accordance with the invention, and having a cargo load suspended from the tongue thereof. For clarity, the aircraft-manual release link and associated cable and bias spring have been partially omitted.

FIGURE 2 is a partially sectionalized top view of the cargo hook taken at line 2—2 of FIGURE 1, but including the aircraft-manual release link.

FIGURE 3 is a partially sectionalized side view of the cargo hook similar to FIGURE 1, but showing the parts as they appear at the instant of full release of the latch assembly, just prior to movement of the tongue to its open position to discharge the cargo load.

FIGURE 4 is a partially sectionalized side view of the cargo hook similar to FIGURE 1, but as it would appear upon closing of the tongue after the cargo has been released. The view includes the aircraft-manual release link and its associated cable and bias spring and omits, for clarity, a portion of the radially extending arm of the solenoid, and the ground-manual release link.

FIGURE 5 is a partially sectionalized side view of a portion of the cargo hook to show the operation of the aircraft-manual release feature of the invention.

FIGURE 6 is a view similar to FIGURE 5, but showing the operation of the ground-manual release feature of the invention.

FIGURE 7 is a schematic electrical diagram showing operation of the switches involved.

FIGURE 8 is a perspective view of a cargo hook built in accordance with the invention.

Referring to the drawings, the cargo release hook 10 has a body member, or housing 11 having vertical side surfaces 12 and 13 connected by full web surfaces 14a–f, inclusive. The hook 10 also has a hook member, or tongue 15 which is pivotally connected at its pivot end 15a to the housing 11 between the side surface extensions 12a and 13a. In its closed position with respect to housing 11, the free end 15b of the tongue 15 will be positioned between side surface extensions 12b and 13b. In such position, the surface 15c of tongue 15 is supported by latch piece 17, resting on surface 17a thereof.

Latch piece 17 forms a part of a latch assembly which is generally indicated by reference numeral 16. Latch assembly 16 also includes a pair of outer links 18a and 18b (which support latch piece 17), a release arm 19, and a splined shaft 20 which passes through and is free to rotate in the housing 11. By means of the spline, outer links 18a and 18b are firmly attached to shaft 20 exteriorly of the side surfaces 12 and 13 of housing 11, and release arm 19 is firmly attached to shaft 20 interiorly of the same surfaces. Thus, the latch assembly 16 is mounted for limited rotative movement, as a unit, with respect to housing 11, the outer surface of the splined shaft 20 bearing on suitable bearing surfaces formed in side surfaces 12 and 13.

Returning to consideration of latch piece 17, the relatively vertical surfaces 17b and 17c thereof extend laterally to provide a stop against the vertical end surfaces of outer links 18a and 18b so that latch piece 17 is free to pivot only in counterclockwise direction (as shown in FIGURE 4) with respect to outer links 18a and 18b about pivot pin 21 which passes between the outer links. A spring 22, which is mounted between fixed projections 23 and 24 of the latch piece 17 and web surface 14c respectively, biases the latch piece 17 to the position shown in FIGURE 1, against outer links 18a and 18b at surfaces 17b and 17c. Thus, when the tongue 15 is swung to its closed position, its free end 15b will force aside the latch piece 17 quite readily by causing the latter to pivot about pivot pin 21 in counterclockwise direction against the bias of the spring 22, as clearly shown in FIGURE 4. When the surface 15c of the tongue 15 during its swing to closed position has passed by the surface 17a of the latch piece 17, the bias of spring 22 will cause the latch piece 17 to pivot in clockwise direction to its position under free end 15b, whereupon the surfaces 15c and 17a will be in contact, as will the surfaces 17b and 17c be in contact with the vertical ends of the outer links 18a and 18b, and the tongue 15 will be securely locked in its closed position. It will be noted that closing of the tongue 15 does not involve movement of any parts of the latch assembly 16 other than latch piece 17, nor movement of any of the internal release mechanism of the cargo hook, later to be described. These mechanisms are therefore less susceptible to wear or malfunction, and there is almost no opportunity for the tongue 15 to jam during closing, or to not be fully locked in closed position.

From the drawings it will be observed that the contacting surfaces 15c and 17a of the tongue and latch piece are at a slight incline, about 15 degrees with respect to the horizontal, when the tongue is locked in its closed position. This incline is for the purpose of promoting quick separation of the tongue from the latch piece when the latch assembly is actuated to release the tongue. Thus, "hang-up" of the tongue upon release thereof is avoided. In addition, when a cargo load (not shown) is suspended from the tongue 15, as by cable means 25, a force component of the weight of the cargo is transmitted to the surface 17a which force effects a tendency in the latch assembly 16 to pivot, or swing towards its opened, or unlocked position with respect to the tongue 15. Thus it will be seen that the presence of any cargo load on the tongue would cause the latch assembly to swing clear of the free end of the tongue, causing the tongue to open and release the cargo, were it not for the presence of a restraining member.

The latch release link, or yoke 26 is the member which restrains the latch assembly 16 to prevent its referred to pivotal unlocking movement in response to the presence of cargo weight on the tongue 15. The latch release yoke 26 has a free end 26a and a yoke end 26b, the latter being connected by pin 27 to bearing extension 11a for swinging, pivotal movement thereabout. Preferably, the extension 11a is formed integrally with the housing 11, and protrudes at a midpoint location from the webbing 14f, or thereabouts as indicated in the drawings.

In its locked position with respect to latch assembly 16, the release yoke 26 engages the release arm 19, at a surface 19a thereof, by roller 28 mounted on roller shaft 29 which extends across the spread of yoke 26 at the yoke end 26b in the general location shown in the drawings. Thus, referring to FIGURE 1, the release arm 19 extends upwardly from splined shaft 20, through the aperture 30 in the webbing 14f, to within the zone of yoke 26 which is formed by the spread of the part at its yoke end 26b. The surface 19a is cut back, or angulated inwardly from the top end of release arm 19 in order to promote a tendency towards locking engagement between surface 19a and roller 28. The release arm 19 extends substantially vertically with respect to the housing 11, and the release yoke 26 substantially horizontally, and it will be readily apparent that if the yoke 26 is swung or pivoted in counterclockwise direction (with reference to the drawings) about its pivot 27, the release arm 19 will be free of restraint as soon as the top end of its surface 19a is passed by the horizontal centerline of the roller 28 on yoke 26. Thus, the entire latch assembly 16 will be free to swing, or pivot in clockwise direction (with reference to the drawings) in response to a cargo load upon tongue 15, the splined shaft 20 pivoting within appropriate bearing apertures in each of the vertical sides 12 and 13 of the housing 11. The release arm 19 will swing in clockwise direction until it comes against the rubber stop 31 which extends across the width of the housing 11 between its vertical sides 12 and 13. A bias spring 32 is connected between the release arm 19 and the yoke 26, as shown, biasing the release arm towards its unlocked position to insure its movement in that direction upon its release. A rubber stop 55 limits the upward, swinging movement of yoke 26 for a purpose which will become apparent.

Movement of the yoke 26 to its unlocked position with respect to release arm 19 may be effected by several alternative modes of operation. As shown in FIGURE 1, a ground-manual release means, comprising an exterior handle 33, a ground-manual release link 34, bias springs 35a and 35b and a roller 36 on the yoke 26, is provided to enable an operator stationed at the landing location of the cargo release hook 10 to manually release the cargo. As shown more clearly by FIGURE 6, the operator will simply pull on the handle 33 to move it in counterclockwise direction (with reference to the drawing). The handle 33 at its lower end is attached to the link 34 by a shaft 37 which passes through vertical side 13 of housing 11 within a suitable bearing. Thus, counterclockwise movement of the handle 33 causes similar movement of link 34 against the roller 36 which protrudes laterally from yoke 26. Further counterclockwise movement will lift the yoke 26, the roller 36 rolling along the edge 34a as the link 34 and yoke 26 move relative to one another. When the cargo has been released, the bias of springs 35a and 35b will draw the link 34 and handle 33 in clockwise direction to return these parts to normal position, the link 34 moving against the stop 72.

A bias spring 37 between the yoke 26 and housing 11 causes the yoke 26 to return to its normal horizontal position upon release of the handle 33, or upon similar withdrawal of any of the release actuating means hereafter to be described. Further, it is to be noted that the top edge surface 19b of release arm 19 is inclined, or angulated downwardly in the direction of the horizontal center of roller 28 on yoke 26. In addition, the stops 31 and 55 are located such that roller 28 will at all times ride on the top edge surface 19b, but never beyond the far corner of that surface. Thus, the bias in spring 37 not only returns the yoke 26 to horizontal position but also, by a small component of its force acting on the inclined surface 19b, causes release arm 19 to always swing back, or pivot in counterclockwise direction, into its locked position with respect to yoke 26 substantially instantaneously upon withdrawal of any of the referred to release actuating means. It will be seen that automatic relocking movement of latch assembly 16 is effected instantaneously after release of the tongue 15, the configuration and arrangement of the parts being such as will assure the jamming, or "hanging up," which would prevent full locking, is virtually impossible.

It is also to be noted that the orientation of the parts with respect to each other is such that very small forces on the parts themselves are required to cause their actuation towards their unlocked positions. For example, the generally right angle relationship of the release arm 19 with respect to the yoke 26 and its rolling contact therewith by roller 28, together with the relatively short distance of surface 19b above the horizontal centerline of roller 28, assures movement to unlocked position upon applicaton of a very small upward force on the yoke free end 26a, yet positive locking is also effected as aforesaid.

Movement of the yoke 26 to its unlocked position with respect to release arm 19 may be also effected, as shown by FIGURES 4 and 5, by an aircraft-manual release means comprising wire cable 38, an aircraft-manual release link 39, a pivotable cable-attachment means 40, bias spring 41, and a roller 73 on the yoke 26. This apparatus permits an operator within the aircraft to manually release the suspended cargo by causing an upward movement of the cable 38 to pull the link 39 in counterclockwise direction against the roller 73. Further pulling movement will lift the yoke 26, the roller 73 rolling along surface 39a in response to relative movement between link 39 and yoke 26. In manner similar to springs 35 of the ground-manual release mechanism, the spring 41 biases the link 39, and hence the cable 38 to return to their normal positions.

As shown in FIGURES 1 and 3, movement of the yoke 26 to its unlocked position with respect to release arm 19 may be also effected by operation of the rotary type, electrical solenoid 42. The rotary solenoid 42 is mounted on housing 11, passing through the vertical side 13 thereof. Actuation of the solenoid is effected by actuation of the solenoid switch 43, which is also mounted within housing 11, through the electrical circuits shown by FIGURE 7, to be more fully explained. For clarity, the interior parts of the solenoid are omitted from the drawings, such being commonly known. It is sufficient to say that upon energizing the solenoid, its shaft 44 will be drawn inwardly, towards the exterior of housing 11, and will simultaneously rotate in an arc of about 45 degrees. Rotation is caused by a tracking arrangement within the solenoid housing, the axial movement of the shaft causing its own rotation by follower means attached thereto which follows a concentrically arranged and spiral-configured track. The shaft 44 extends out from solenoid 42 into the interior of housing 11. A radially extending arm 45 is attached thereto for rotation with the solenoid shaft. Thus, when the solenoid is energized, the arm 45 will rotate in clockwise direction (with reference to the drawings) about 45 degrees. Since the arm 45 engages the underside of the yoke 26 at its free end 26a, such movement of the arm 45 will lift the yoke 26 to release the release arm 19, as previously described. Within the rotary solenoid housing, the shaft 44 is spring biased to return to its normal position upon deenergization of the solenoid and, consequently, the arm 45 will be caused to rotate in counterclockwise direction to return to its normal position as shown by FIGURE 1. This permits yoke 26 to react to the bias of its bias spring 37, as before described, to return to horizontal position to lock the release arm 19 in place. The solenoid switch 43 may be actuated either by an operator within the aircraft, or by the automatic touchdown apparatus to be presently described.

The pivot end 15a of the tongue 15 is provided with a slot 46 which extends vertically with respect to housing 11 when the tongue 15 is in the closed position. The tongue 15 is connected for pivotal movement by shaft 47 which extends between the side extension 12a and 13a of the housing 11 and through the slot 46. Within the slot 46 and above the shaft 47 there is arranged a compression spring 48 and its associated bearing pieces 49 and 50. The bearing pieces 49 and 50 extend in width the thickness of the tongue 15 and are shaped as shown to inhibit lateral movement of compression spring 48. Thus, by reacting upon the shaft 47, the compression spring 48 will bias the pivot end 15a of the tongue upwardly towards the housing 11. A cargo load applied to the tongue will cause compression of the spring 48 and slight downward vertical movement of the free end 15a of the tongue against the direction of spring bias.

A plunger 51 is mounted between bearing surfaces 11b and 11c for limited vertical movement within housing 11 for actuating the solenoid switch 43. The plunger 51 has a bell-shaped cam projection 52 secured thereto so that upward vertical movement of the plunger will press the cam follower 53 towards the switch 43, thereby closing the same to energize solenoid 42. Vertical movement of the plunger 51 is limited so as to prevent override of the cam follower 53 at the high end of the projection 52. A compression spring 54 biases plunger 51 towards its lowermost position, as shown in FIGURE 1, when a cargo load is present on the tongue 15.

Tongue 15 also has a projection 15d which contacts the end of plunger 51 when the tongue is in closed position. Thus, when the tongue 15 is open, the plunger 51 is always at its lowermost position. When the tongue 15 is closed, the plunger 51 will be either in its uppermost or lowermost position depending upon whether a cargo load is present on the tongue which is sufficient to compress the spring 48. If, say, a downward force of 100 lbs. is required to compress the spring 48, the pivot end 15a of the tongue and hence the plunger 51 will be in their uppermost positions when the force is 100 lbs. or less. When the downward force on the tongue is greater than 100 lbs., the pivot end 15a and the plunger 51 will be in their lowermost positions. Of course, a compression spring may be selected which will respond to a force in amount other than 100 lbs.

It becomes apparent that the operation of the cargo release hook 10 under automatic touchdown release control conditions is as follows: Assuming that a cargo load has been suspended from the tongue 15 by cable means 25 and is wholly supported thereby as when being transported a distance by helicopter, upon lowering the cargo release hook 10 and cargo (not shown) into contact with the ground, the ground begins to support more and more of the cargo weight with resulting decrease in the amount thereof being supported by tongue 15. When a point is reached whereat the load being supported by the tongue 15 becomes less than 100 lbs., the pivot end 15a of the tongue reacts to the lightened load by moving upwardly towards housing 11, this movement being promoted by the bias of compression spring 48. Upward movement of pivot end 15a causes upward movement of plunger 51 against the bias of spring 54, whereupon cam 52 causes a downward pressure on follower 53 to close a contact within switch 43. Closing this contact causes electric current to flow in the rotary solenoid 42, energizing the same to cause clockwise rotation of its radially extending arm 45 in amount about 45 degrees. As a consequence, arm 45 lifts the latch release yoke 26 to permit release arm 19, assisted by spring 32, to fall against the stop 31. Because of the splined connection between release arm 19 and the balance of the latch assembly 16, the entire latch assembly pivots to the tongue release position. The free end 15b of the tongue will swing free due to the presence of the 100 lb. load on the tongue 15, and the cargo will be released by sliding off the tongue at its free end.

Because of the orientation of the internal parts with respect to each other as aforesaid, only a very small force acting on the free end 26a of the yoke 26 is required to actuate the cargo hook to release the relatively heavy cargo load which may be suspended from it. Thus, the force which must be applied to either the handle 33 or the cable 38 to manually release the cargo, or by the solenoid arm 45, is also very small. It will be found that a relatively small solenoid 42 may be used, and that a force of only about 10 lbs. need be exerted on handle 33 or cable 38 to actuate the release mechanism. This compares, for example, to the 25–35 lbs. of manual force required to actuate previous manually operable cargo hooks. Further, it should be noted that, where smaller applied forces are required, operation of the cargo release mechanism will be more instantaneously responsive.

To protect the solenoid 42 against burn out due to current flow therein, a cut-out switch is provided within the solenoid mechanism 42 to stop the flow of electric current to the solenoid immediately upon the arm 45 having reached about 45 degrees of rotation. Thus, the solenoid 42 will become deenergized upon the arm 45 having achieved its purpose of lifting the yoke 26, and therefore the spring bias on shaft 44 will cause instantaneous and opposite rotation of arm 45 at this point which will return it to normal position. As a result, the yoke 26 will fall in response to the bias action of spring 37 to its locked position with respect to release arm 19. Roller 28 on yoke 26 acting on surface 19a and b will assure return of latch assembly to its locked position even while the tongue 15 remains open.

It will be noted that the above operation description commenced upon the assumption that the cargo load had already been in full suspension on the cargo release hook. When such is the case, the plunger 51 is in its lowermost position, and it has been explained that the switch 43 at that time will be open and solenoid 42 deenergized. However, prior to the time when the cargo load is suspended, the plunger will be in its uppermost position which, as is above explained, will ordinarily actuate switch 43. To prevent actuation of switch 43 before the cargo has been suspended from the tongue, a manual switch 56 is provided, preferably located within the aircraft, which is to remain open until the cargo has been rigged. After the cargo has been wholly suspended, this switch is manually closed, thereby "priming" the electrical system for automatic operation upon cargo touchdown, as described.

This circuitry will become more apparent by reference to the electrical schematic diagram of FIGURE 7. Dotted area A represents circuitry within the body of the aircraft, area H represents the cargo hook 10, area S indicates the solenoid 42, and area SW indicates the solenoid switch 43. For automatic touchdown release operation, the switch 56 is closed by the operator to "prime" the circuitry after the cargo load is in suspension on the tongue 15. Upon touchdown of the cargo, as above described, switch 43 will close to position 2 thereby energizing the solenoid 42, the switch 57 normally being spring biased to its closed position 1—1. Switch 57 is the "burn-out" prevention switch and will be mechanically moved to its position 2—2 upon arm 45 having rotated 45 degrees. In its position 2—2, switch 57 will complete a circuit to energize a small holding coil 58 to hold open the circuit to solenoid 42, thereby preventing burn-out while switch 43 remains in its position 2. When switch 56 is opened, the entire circuit will be deenergized and switch 57 will spring back to its position 1—1.

For solenoid operation independent of the automatic touchdown feature, a switch 59 is provided to be closed by the operator to energize solenoid 42 at any time the cargo is to be released. Again, switch 57 will be mechanically moved against its spring bias to its position 2—2 when arm 45 has been rotated 45 degrees, thereby energizing hold coil 58 to prevent burn out of the solenoid. When switch 59 is opened, switch 57 springs back to its position 1—1.

In order to provide adjustment of release sensitivity in response to load reduction, an adjustment cam 60 is provided which may be manually rotated a few degrees and then secured in position to affect the normal, substantially horizontal positioning of the yoke 26. Cam 60 is mounted for off-center rotation relative to its cam shaft 61 which has a locking screw associated therewith, as appears in the drawings. Thus, the locking screw on the shaft 61 is first loosened, whereupon the cam 60 may be manually rotated a few degrees to increase the reaction sensitivity of the mechanism to release the cargo load. For example, referring to FIGURE 1, if the cam 60 is rotated several degrees in clockwise direction from that shown, the yoke 26 is lifted slightly so that its roller 28 rests higher on the surface 19a of release arm 19. Yoke 26 will therefore require less additional lifting by the solenoid arm 45, or by either of the manual actuating means, to release the latch assembly 16. When the cargo load comes into contact with the ground, its weight begins to be transferred to the ground more or less rapidly depending upon the rate of speed with which it is being lowered. With the roller 28 riding higher on the surface 19a, release of the latch assembly 16 becomes more instantaneous upon reduction of tongue-supported load to, say, 100 lbs. which is that weight to which compression spring 48 is sensitive. On the other hand, if by adjustment of the cam 60 in counterclockwise direction the yoke 26 and hence roller 28 rides lower, some slight additional time is required for the yoke 26 to move to the unlocked position. Because of the relative rapidity with which the cargo load is being lowered, this slight time delay has the effect of releasing the load at a time when the weight of the tongue-supported load has become somewhat less than 100 lbs. It may therefore be said that adjustment of the cam 60 will adjust the apparatus with respect to the amount of weight load on the tongue which will cause actuation of the mechanism to release the cargo. This is so within a range of weight limits determined by the first amount of bias in the compression spring 48.

The arrangement and construction of the parts of the novel apparatus described is such that all of those which are susceptible to corrosion or interference by the presence of dirt, etc. may be conveniently enclosed by a waterproof and dustproof housing as shown in the drawings. For example, the novel outer links arrangement provides means whereby a natural access passageway for dust or water to the interior of the housing is eliminated. In addition, the plunger 51 is provided with sliding seal means 62 to seal the housing passageway through which it passes to the exterior. Other access passageways to the interior of the housing such as the top panel 63 and side panels 64 and 64a, as shown in FIGURE 8, are suitably gasketed. Access way 65 for the wire cable 38, and access way 66 for the electrical wiring leads (not shown) will be suitably closed off from atmospheric elements when these means have been properly connected using cable shielding. It will be noted that all of the internal mechanism of the cargo hook will be exposed by removal of the large side panel 64. Thus, inspection and maintenance are made more convenient.

Other features of the present cargo release hook are the shackles 67 and 68 for cable attachment of the unit to an aircraft, the shackles being connected to the housing 11 by shackle pins 69 and 70, and a rubber stop 71 located behind the pivot end 15a of tongue 15, as shown, to prevent uncontrolled swinging movement of the tongue upon release of the cargo.

Thus a novel cargo release hook has been described which achieves all of the objects sought to be attained. It is apparent that changes or variations in the construction might be made by those having skill in the art which would not depart from the principles of the invention, and all such changes and variations are intended to be within the scope of the appended claims.

What is claimed is:

1. A cargo release hook comprising a housing; a load supporting tongue mounted at one of its ends to said housing for pivotal swinging movement to its open or closed positions with respect to said housing; latch means mounted to said housing for engaging the opposite end of said tongue to lock it in said closed position and movable with respect to said housing to disengage said opposite end to permit movement of the tongue to said open position; said latch means comprising a sub-assembly including a pair of outer links exterior of said housing and a release arm interior of said housing, a shaft pivotally mounted to and extending through the width of said housing, said outer links and said release arm being immovably attached to said shaft, a latch piece associated with said outer links and rotatably connected to said shaft, whereby said latch piece is rotatable with respect to said sub-assembly, stop means connected to said latch piece and adaptable with said outer links to limit rotation of said latch piece in one direction, bias means connected to said latch piece to bring said stop means into engagement with said outer links; a latch release yoke mounted within said housing engaging said release arm for movement with respect to said arm to cause said disengaging movement of the latch means; and means for causing said movement of the latch release yoke, whereby said tongue is locked in closed position by rotating it to contact said latch piece, and then continuing such rotation, thereby moving said latch piece against the biasing forces of said bias means to move said latch piece out of the path of said tongue, said latch piece rotating back into engagement with said outer links after said tongue has passed, thereby preventing said tongue from movement in the opposite direction, and said tongue is disengaged by the pivotal swinging movement of said latch means about the axis of said shaft.

2. A cargo release hook comprising a housing; a load supporting tongue mounted at one of its ends to said housing for pivotal swinging movement to its open or closed positions with respect to said housing; means normally biasing said one end of the tongue upwardly towards said housing and to permit limited vertical movement of said one end of the tongue in direction opposite to said bias in response to application of said load; latch means mounted to said housing for engaging the opposite end of said tongue to lock it in said closed position and movable with respect to said housing to disengage said opposite end to permit movement of the tongue to said open position; said latch means comprising a sub-assembly including a pair of outer links exterior of said housing and a release arm interior of said housing, a shaft pivotally mounted to and extending through the width of said housing, said outer links and said release arm being immovably attached to said shaft, a latch piece associated with said outer links and rotatably connected to said shaft, whereby said latch piece is rotatable with respect to said sub-assembly, stop means connected to said latch piece and adaptable with said outer links to limit rotation of said latch piece in one direction, bias means connected to said latch piece to bring said stop means into engagement with said outer links; a latch release yoke mounted within said housing engaging said release arm and movable with respect thereto to cause said disengaging movement of the latch means; solenoid means mounted to said housing for causing said movement of the latch release yoke; and a solenoid actuating switch having an associated plunger, said plunger movable in response to said vertical movement of said one end of the tongue to actuate said switch, whereby said tongue is locked in closed position by rotating it to contact said latch piece, and then continuing such rotation, thereby moving said latch piece against the biasing forces of said bias means to move said latch piece out of the path of said tongue, said latch piece rotating back into engagement with said outer links after said tongue has passed, thereby preventing said tongue from movement in the opposite direction, and said tongue is disengaged by the pivotal swinging movement of said latch means about the axis of said shaft.

3. A cargo release hook comprising a housing; a load supporting tongue mounted at one of its ends to said housing for pivotal swinging movement to its open or closed positions with respect to said housing, said housing having side extensions and a shaft therebetween extending the width of said housing for mounting said one end of the tongue; means normally biasing said one end of said tongue upwardly towards said housing and to permit limited vertical movement of said one end of the tongue in direction opposite to said bias in response to application of said load, said biasing means including a compression spring mounted above said shaft within a slot of said tongue, the slot extending vertically when said tongue is in its closed position; latch means mounted to said housing for engaging the opposite end of said tongue to lock it in said closed position and movable with respect to said housing to disengage said opposite end to permit movement of the tongue to said open position; said latch means comprising a sub-assembly including a pair of outer links and exterior of said housing and a release arm interior of said housing, a shaft pivotally mounted to and extending through the width of said housing, said outer links and said release arm being immovably attached to said shaft, a latch piece associated with said outer links and rotatably connected to said shaft, whereby said latch piece is rotatable with respect to said sub-assembly, stop means connetced to said latch piece and adaptable with said outer links to limit rotation of said latch piece in one direction, bias means connected to said latch piece to bring said stop means into engagement with said outer links, a latch release yoke mounted at its yoke end within said housing for pivotal swinging movement to its locked or unlocked positions with respect to said release arm; said latch release yoke engaging a free end of said release arm at a location between the spread of the yoke along the length of the former; a rotary type electrically operated solenoid mounted within said housing and having its shaft extending in the direction of the width of said housing; a radially extending arm of said solenoid shaft engaging the opposite end of said latch release yoke for moving the same to its unlocked position with respect to said release arm; and a solenoid actuating switch having an associated plunger, said plunger movable in response to said vertical movement of said one end of the tongue to actuate said switch, whereby said tongue is locked in closed position by rotating it to contact said latch piece, and then continuing such rotation, thereby moving said latch piece against the biasing forces of said bias means to move said latch piece out of the path of said tongue, said latch piece rotating back into engagement with said outer links after said tongue has passed, thereby preventing said tongue from movement in the opposite direction, and said tongue is disengaged by the pivotal swinging movement of said latch means about the axis of said shaft.

4. In a cargo release hook automatically operable to release a cargo load in response to substantial load reduction upon touchdown of the load on a load supporting surface and having a load supporting tongue mounted thereon for movement to its open or closed positions with respect to the housing of said cargo release hook, tongue locking and release means comprising a latch assembly pivotally connected to said housing adapted for releasably engaging said tongue, a latch release arm of said latch assembly extending into said housing, a latch release yoke pivotally connected to said housing and operably engaging said release arm whereby when the release yoke is pivoted to its unlocked position with respect to said release arm the latter will move causing said latch assembly to unlock said tongue permitting the tongue to move to its open position, means to cause said pivotal movement of the release yoke, and load-release sensitivity adjustment means associated with said latch release yoke to cause said pivotal movement of the latter responsive to a predetermined amount of said load reduction, said adjustment means comprising an adjustment cam mounted on said housing and providing eccentric movement in response to rotation thereof, rotation of said cam causing rotation of said yoke, thereby changing the pivotal movement required to free said release arm.

5. The cargo release hook of claim 3 in which said latch piece has an upward facing flat surface and said tongue has a downward facing flat surface adapted to engage the said flat surface of said latch piece when in its closed position, the plane formed by the intersection of said flat surfaces being inclined with respect to the horizontal thereby facilitating opening of said hook.

References Cited in the file of this patent
UNITED STATES PATENTS

| | | |
|---|---|---|
| 2,758,867 | Elsner | Aug. 14, 1956 |
| 2,868,580 | Stevens | Jan. 13, 1959 |
| 2,868,581 | Minty et al. | Jan. 13, 1959 |
| 2,904,369 | Campbell | Sept. 15, 1959 |